United States Patent
Yoon

(10) Patent No.: US 11,943,394 B2
(45) Date of Patent: Mar. 26, 2024

(54) WIRELESS INTERCOM SYSTEM AND GROUP PAIRING METHOD OF WIRELESS INTERCOM SYSTEM

(71) Applicant: SENA TECHNOLOGIES INC., Seoul (KR)

(72) Inventor: Sung Won Yoon, Seoul (KR)

(73) Assignee: SENA TECHNOLOGIES INC., Seoul (KR)

( * ) Notice: Subject to any disclaimer, the term of this patent is extended or adjusted under 35 U.S.C. 154(b) by 448 days.

(21) Appl. No.: 17/290,067

(22) PCT Filed: Oct. 31, 2019

(86) PCT No.: PCT/KR2019/014545
§ 371 (c)(1),
(2) Date: Apr. 29, 2021

(87) PCT Pub. No.: WO2020/105895
PCT Pub. Date: May 28, 2020

(65) Prior Publication Data
US 2021/0400145 A1    Dec. 23, 2021

(30) Foreign Application Priority Data
Nov. 20, 2018    (KR) .................. 10-2018-0143537

(51) Int. Cl.
*H04M 9/00* (2006.01)
*G06K 7/14* (2006.01)
(Continued)

(52) U.S. Cl.
CPC .......... *H04M 9/001* (2013.01); *G06K 7/1417* (2013.01); *H04W 12/55* (2021.01); *H04W 76/14* (2018.02); *H04W 84/20* (2013.01)

(58) Field of Classification Search
CPC .... H04M 9/001; G06K 7/1417; H04W 12/55; H04W 76/14; H04W 84/20; H04W 4/08; H04W 8/186
See application file for complete search history.

(56) References Cited

U.S. PATENT DOCUMENTS

| 5,684,997 | A  | * | 11/1997 | Kau | ........................ | G06F 13/24 |
|---|---|---|---|---|---|---|
|  |  |  |  |  |  | 710/260 |
| 6,783,071 | B2 | * | 8/2004 | Levine | ...................... | G07G 1/14 |
|  |  |  |  |  |  | 235/462.46 |
| 9,049,567 | B2 | * | 6/2015 | Le Guen | ................. | H04W 4/38 |

(Continued)

FOREIGN PATENT DOCUMENTS

| KR | 10-2010-0053986 A | 5/2010 |
|---|---|---|
| KR | 10-1033170 B1 | 5/2011 |

(Continued)

OTHER PUBLICATIONS

Andrea Sorrentino, "EP Search Report for EP Application No. 19886268", dated Jun. 15, 2022, EPO, Germany.

*Primary Examiner* — Lisa Hashem
(74) *Attorney, Agent, or Firm* — NKL LAW; Jae Youn Kim

(57) ABSTRACT

A group pairing method of a wireless intercom system according to an aspect includes: scanning, by a mobile device wirelessly connected to a master wireless intercom device, QR codes displayed on mobile devices respectively wirelessly connected to a plurality of slave wireless intercom devices to add the plurality of slave wireless intercom devices to an intercom group as members ('intercom group members'); setting a connection order of the intercom group members by using the mobile device wirelessly connected to the master wireless intercom device; and wirelessly chain-connecting the plurality of slave wireless intercom devices to the master wireless intercom device according to the set connection order.

5 Claims, 13 Drawing Sheets

(51) Int. Cl.
  *H04W 12/55* (2021.01)
  *H04W 76/14* (2018.01)
  *H04W 84/20* (2009.01)

(56) References Cited

U.S. PATENT DOCUMENTS

| | | | |
|---|---|---|---|
| 9,357,574 B2 | 5/2016 | Lee et al. | |
| 9,623,319 B2* | 4/2017 | Miller | A63F 9/24 |
| 10,009,286 B2* | 6/2018 | Gillon | H04L 12/2863 |
| 10,069,640 B2 | 9/2018 | Zhang et al. | |
| 10,305,900 B2* | 5/2019 | Sethi | H04L 63/06 |
| 10,771,271 B2 | 9/2020 | Zhang et al. | |
| 2007/0037568 A1* | 2/2007 | Warner | G01S 5/0289 |
| | | | 455/422.1 |
| 2007/0076672 A1* | 4/2007 | Gautier | H04W 84/20 |
| | | | 370/338 |
| 2009/0282130 A1* | 11/2009 | Antoniou | H04W 12/08 |
| | | | 709/220 |
| 2011/0081860 A1 | 4/2011 | Brown et al. | |
| 2012/0077438 A1 | 3/2012 | Jung | |
| 2013/0018960 A1* | 1/2013 | Knysz | H04L 65/403 |
| | | | 709/204 |
| 2013/0282912 A1* | 10/2013 | Yo | H04W 4/21 |
| | | | 709/228 |
| 2014/0045472 A1* | 2/2014 | Sharma | H04L 12/1818 |
| | | | 455/416 |
| 2016/0249022 A1 | 8/2016 | Iida et al. | |
| 2018/0310033 A1* | 10/2018 | Johnson | H04N 21/43072 |
| 2020/0375011 A1* | 11/2020 | Tsibulevskiy | H02J 7/00036 |
| 2021/0303254 A1* | 9/2021 | Wang | H04R 3/12 |
| 2021/0410217 A1* | 12/2021 | Yoon | H04W 76/15 |

FOREIGN PATENT DOCUMENTS

| | | |
|---|---|---|
| KR | 10-1352459 B1 | 1/2014 |
| KR | 10-2014-0082223 A | 7/2014 |
| KR | 10-1591893 B1 | 2/2016 |

* cited by examiner

| Group Name | Sena Rider |

10— ADD | UP | DOWN | DELETE | MASTER

STATUS : BLE disconnected     IC    BLE    EIR

| 1 | User 1 | M | | |
| 2 | | | | |
| 3 | | | | |
| 4 | | | | |
| 5 | | | | |
| 6 | | | | |
| 7 | | | | |
| 8 | | | | |

START SMART PAIRING | TERMINATE SMART PAIRING | LEAVE GROUP

FIG. 2

WIRELESS INTERCOM SYSTEM AND GROUP PAIRING METHOD OF WIRELESS INTERCOM SYSTEM

TECHNICAL FIELD

The present invention relates to wireless intercom techniques.

BACKGROUND ART

A wireless intercom system enables multipoint calls without an operation by a user. Therefore, this system is useful as an effective auxiliary device in activities of various groups.

However, if a master device and slave devices of the wireless intercom system are paired in groups, that is, a group intercom connection is established once, when some users want to leave the intercom group, or when a specific situation occurs, for example, when an unexpected device disconnection occurs, it is difficult to correct the group intercom connection.

Thereby, a wireless intercom technique, in which the group intercom connection can be easily maintained/repaired even when a specific situation occurs during the group intercom, is required.

SUMMARY OF INVENTION

Problems to be Solved by Invention

It is an object of the present invention to provide a wireless intercom system and a group pairing method of a wireless intercom system.

Means for Solving Problems

To achieve the above object, according to an aspect of the present invention, there is provided a group pairing method of a wireless intercom system including: scanning, by a mobile device wirelessly connected to a master wireless intercom device, QR codes displayed on mobile devices respectively wirelessly connected to a plurality of slave wireless intercom devices to add the plurality of slave wireless intercom devices to an intercom group as members ('intercom group members'); setting a connection order of the intercom group members by using the mobile device wirelessly connected to the master wireless intercom device; and wirelessly chain-connecting the plurality of slave wireless intercom devices to the master wireless intercom device according to the set connection order.

The group pairing method of a wireless intercom system may further include: if the chain-connection of at least one slave wireless intercom device among the plurality of slave wireless intercom devices is disconnected, searching for at least one slave wireless intercom device that has lost the chain-connection, by using a wireless intercom device that has been connected to the at least one slave wireless intercom device that has lost the chain-connection; and automatically wirelessly connecting the wireless intercom device that has been connected to the at least one slave wireless intercom device that has lost the chain-connection with the searched at least one slave wireless intercom device.

The step of searching for the at least one slave wireless intercom device that has lost the chain-connection may include: searching for the at least one slave wireless intercom device that has lost the chain-connection using an inquiry response search method.

The group pairing method of a wireless intercom system may further include: searching for at least one slave wireless intercom device through an inquiry scanning method by the master wireless intercom device, and setting the searched at least one slave wireless intercom device as an intercom group member.

The group pairing method of a wireless intercom system may further include setting one of the plurality of slave wireless intercom devices as a master wireless intercom device, when the master wireless intercom device requests to leave from the intercom group during group intercom.

Advantageous Effects

Since the wireless intercom device may be wirelessly connected to the mobile device and the group intercom connection may be maintained/repaired with the mobile device wirelessly connected to the wireless intercom device, it is possible to improve convenience of a user. In addition, even when an unexpected situation occurs during the group intercom, it is possible to easily maintain/repair the group intercom connection.

BRIEF DESCRIPTION OF DRAWINGS

FIGS. 2 to 5 are views for describing a process of establishing group pairing.

MODE FOR CARRYING OUT INVENTION

Figure 1:
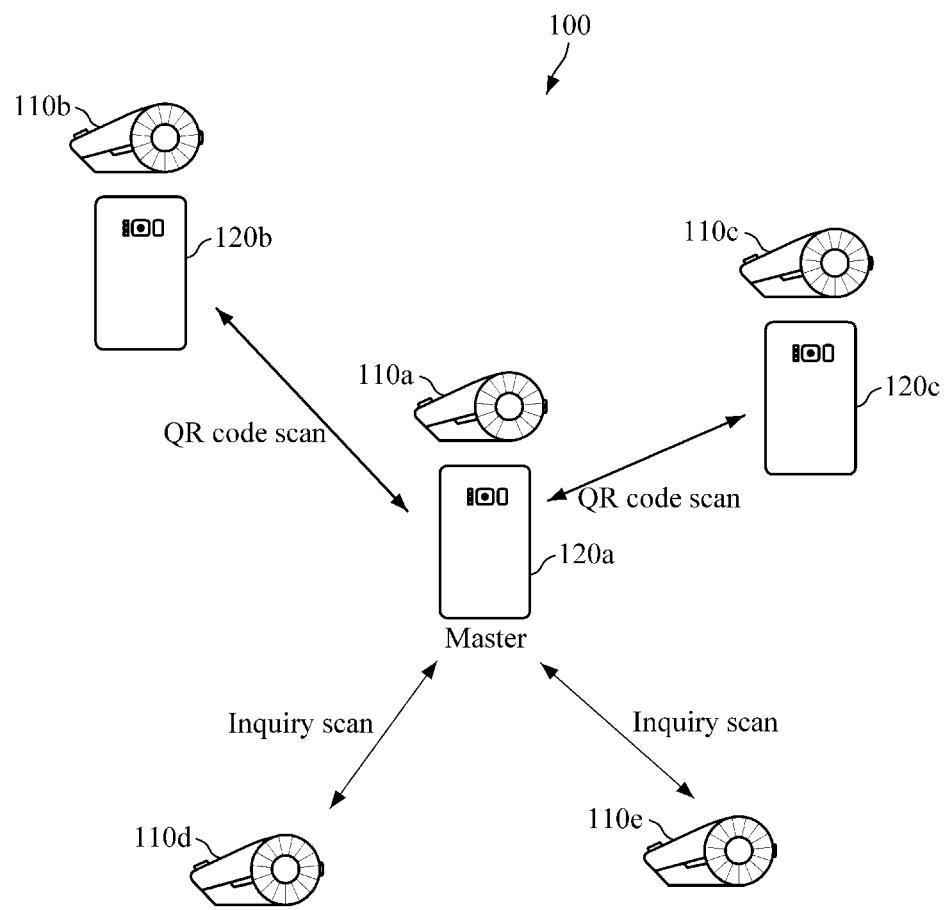
FIG. 1 is a view illustrating an embodiment of a wireless intercom system.

Hereinafter, embodiments will be described in detail with reference to the accompanying drawings. In denoting reference numerals to constitutional elements of respective drawings, it should be noted that the same elements will be denoted by the same reference numerals although they are illustrated in different drawings. Further, in description of preferred embodiments of the present invention, the publicly known functions and configurations related to the present invention, which are judged to be able to make the purport of the present invention unnecessarily obscure will not be described in detail.

Meanwhile, in respective steps, each of the steps may occur differently from the specified order unless a specific order is clearly described in the context. That is, each of the steps may be performed in the same order as the specified order, may be performed substantially simultaneously, or may be performed in the reverse order.

Further, wordings to be described below are defined in consideration of the functions in the present invention, and may differ depterminating on the intentions of a user or an operator or custom. Accordingly, such wordings should be defined on the basis of the contents of the overall specification.

It will be understood that, although the terms first, second, etc. may be used herein to describe various components, but these components should not be limited by these terms. These terms are used only to distinguish one component from other components. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

In addition, a division of the configuration units in the present disclosure is intended for ease of description and divided only by the main function set for each configuration unit. That is, two or more of the configuration units to be described below may be combined into a single configuration unit or formed by two or more of divisions by function into more than a single configuration unit. Further, each of the configuration units to be described below may additionally perform a part or all of the functions among functions set for other configuration units other than being responsible for the main function, and a part of the functions among the main functions set for each of the configuration units may be exclusively taken and certainly performed by other configuration units. Each of the configuration units to be described below may be implemented as hardware or software, or may be implemented as a combination of hardware and software.

FIG. 1 is a view illustrating an embodiment of a wireless intercom system.

Referring to FIG. 1, a wireless intercom system 100 may include first to fifth wireless intercom devices 110a to 110e, and first to third mobile devices 120a to 120c. The group intercom system 100 shown in FIG. 1 includes five wireless intercom devices 110a to 110e, and three mobile devices 120a to 120c, but this is only for convenience of description, and the number of wireless intercom devices and the number of mobile devices are not particularly limited.

The first to fifth wireless intercom devices 110a to 110e may be wirelessly chain-connected with each other through group pairing to form an intercom group and perform multipoint calls. In this case, wireless connections between the respective wireless intercom devices 110a to 110e may be established based on Bluetooth. As used herein, the wireless chain-connection may refer to a connection in which the devices are wirelessly connected in series like a chain. For example, the wireless chain-connection may refer to a connection scheme in which a first wireless intercom device 110a is wirelessly connected to a second wireless intercom device 110b, a second wireless intercom device 110b wirelessly connected to the first wireless intercom device 110a is wirelessly connected to a third wireless intercom device 110c, the third wireless intercom device 110c wirelessly connected to the second wireless intercom device 110b is wirelessly connected to a fourth wireless intercom device 110d, and the fourth wireless intercom device 110d wirelessly connected to the third wireless intercom device 110c is wirelessly connected to a fifth wireless intercom device 110e.

The first to third mobile devices 120a to 120c may be wirelessly connected to the first to third wireless intercom devices 110a to 110c, respectively, using low-power Bluetooth. For example, a first mobile device 120a may be Bluetooth connected to the first wireless intercom device 110a, a second mobile device 120b may be Bluetooth connected to the second wireless intercom device 110b, and a third mobile device 120c may be Bluetooth connected to the third wireless intercom device 110c. Each of the mobile devices 120a to 120c may display intercom group information to which the wireless intercom devices 110a to 110c connected to themselves belong, group intercom connection status information of intercom group members and the like.

Each of the wireless intercom devices 110a, 110b, 110c, 110d, and 110e may operate as a master wireless intercom device or a slave wireless intercom device according to setting of a user. Unlike the slave wireless intercom device, the master wireless intercom device may generally control an overall operation of the group intercom, such as modifying an intercom group member, modifying a connection order of the intercom group members, and starting and terminating the group pairing or group intercom.

Hereinafter, a process of establishing group pairing will be described in detail with reference to FIGS. 2 to 13. For convenience of the description, a case, in which the first wireless intercom device 110a operates as a master wireless intercom device, and the second to fifth wireless intercom devices 110b to 110e operate as slave wireless intercom devices, will be described as an example.

FIGS. 2 to 5 are views for describing the process of establishing group pairing.

Figure 3:
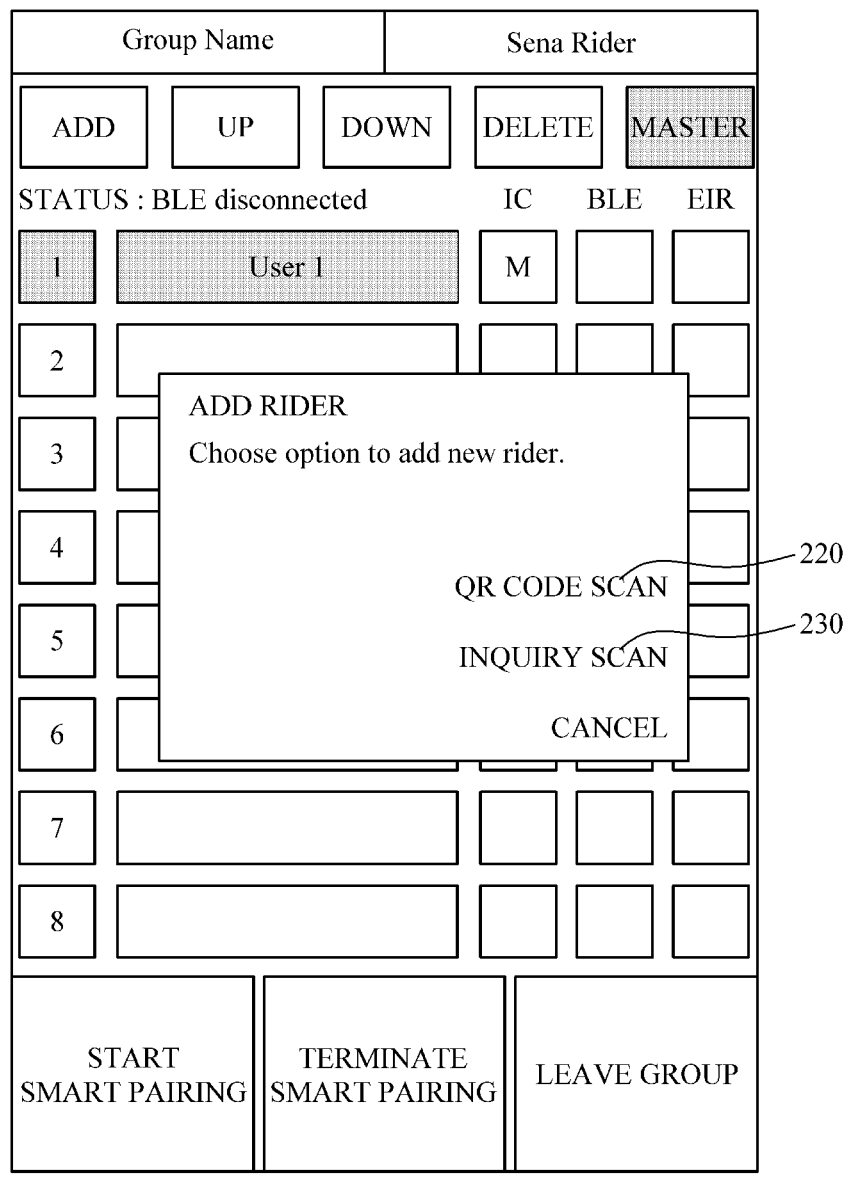

Referring to FIGS. 2 to 5, the first mobile device 120a Bluetooth connected to the first wireless intercom device 110a which is the master wireless intercom device may display an interface screen as shown in FIG. 2. When a user of the first wireless intercom device 110a selects an object 210 on the interface screen, as shown in FIG. 3, the first mobile device 120a may display intercom group member addition methods that can be selected by the user.

When the user of the first wireless intercom device 110a selects an object 220, the first mobile device 120a adds an intercom group member through a QR code scanning method, and when the user of the first wireless intercom device 110a selects an object 230, the first mobile device 120a may add an intercom group member through an inquiry scanning method.

For example, when the user of the first wireless intercom device 110a selects the object 220, the first mobile device 120a may display an interface screen for scanning a QR code. In addition, the first mobile device 120a may scan QR codes displayed on the second mobile device 120b wirelessly connected to the second wireless intercom device 110b and the third mobile device 120c wirelessly connected to the third wireless intercom device 110c according to a command from the user to obtain information on the second wireless intercom device 110b and the third wireless intercom device 110c (e.g., name, BDADDR, etc.), and add the second wireless intercom device 110b and the third wireless intercom device 110c to the intercom group.

As another example, when the user of the first wireless intercom device 110a selects the object 230, the first mobile device 120a may generate a wireless intercom search command in the inquiry scanning method and transmit it to the first wireless intercom device 110a. The first wireless intercom device 110a may receive the wireless intercom search command in the inquiry scanning method from the first mobile device 120a, and search for the fourth wireless intercom device 110d and the fifth wireless intercom device 110e in an inquiry scanning state to obtain information on the fourth wireless intercom device 110d and the fifth wireless intercom device 110e (e.g., name, BDADDR, etc.), and add the fourth wireless intercom device 110d and the fifth wireless intercom device 110e to the intercom group.

Figure 4:
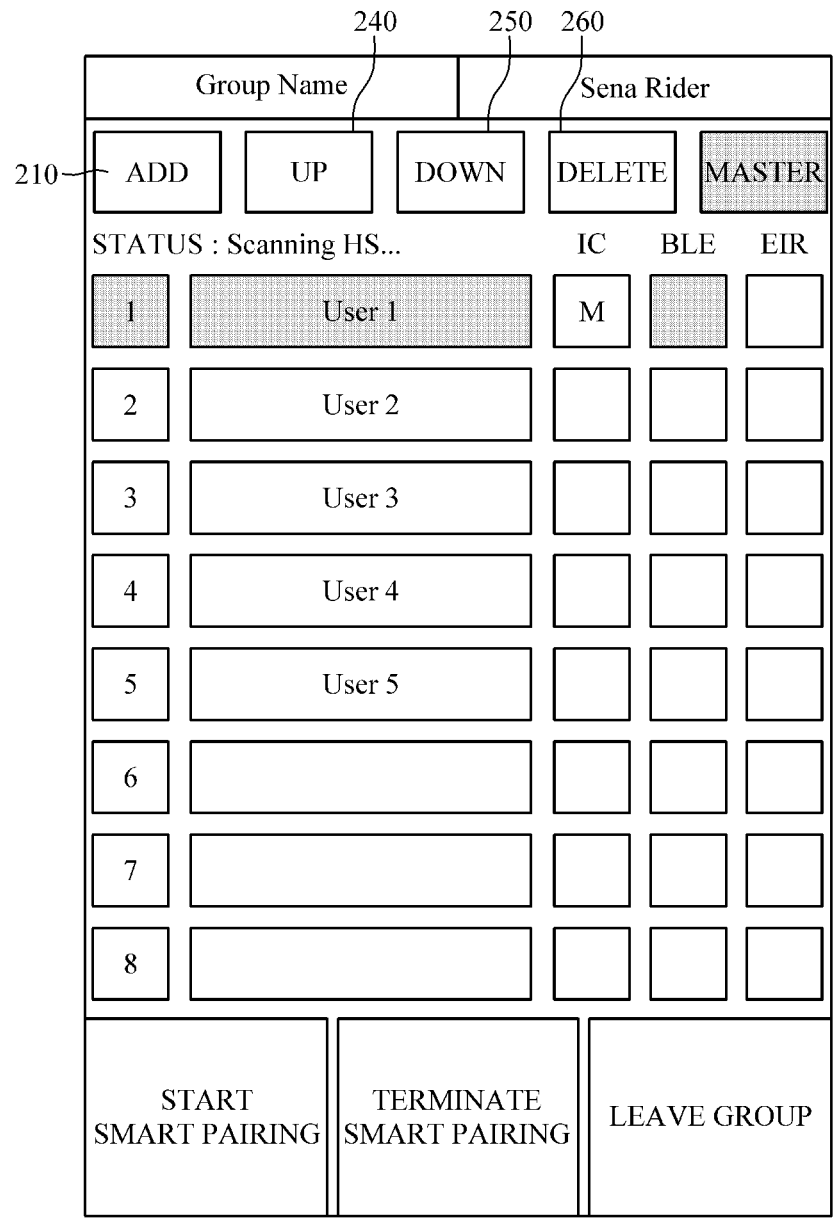

The first mobile device 120a may display a member list of the intercom group as shown in FIG. 4, and the user of the first wireless intercom device 110a may add or delete an intercom group member, and/or adjust and set a connection order therebetween using objects 210, 240, 250 and 260.

Figure 5:
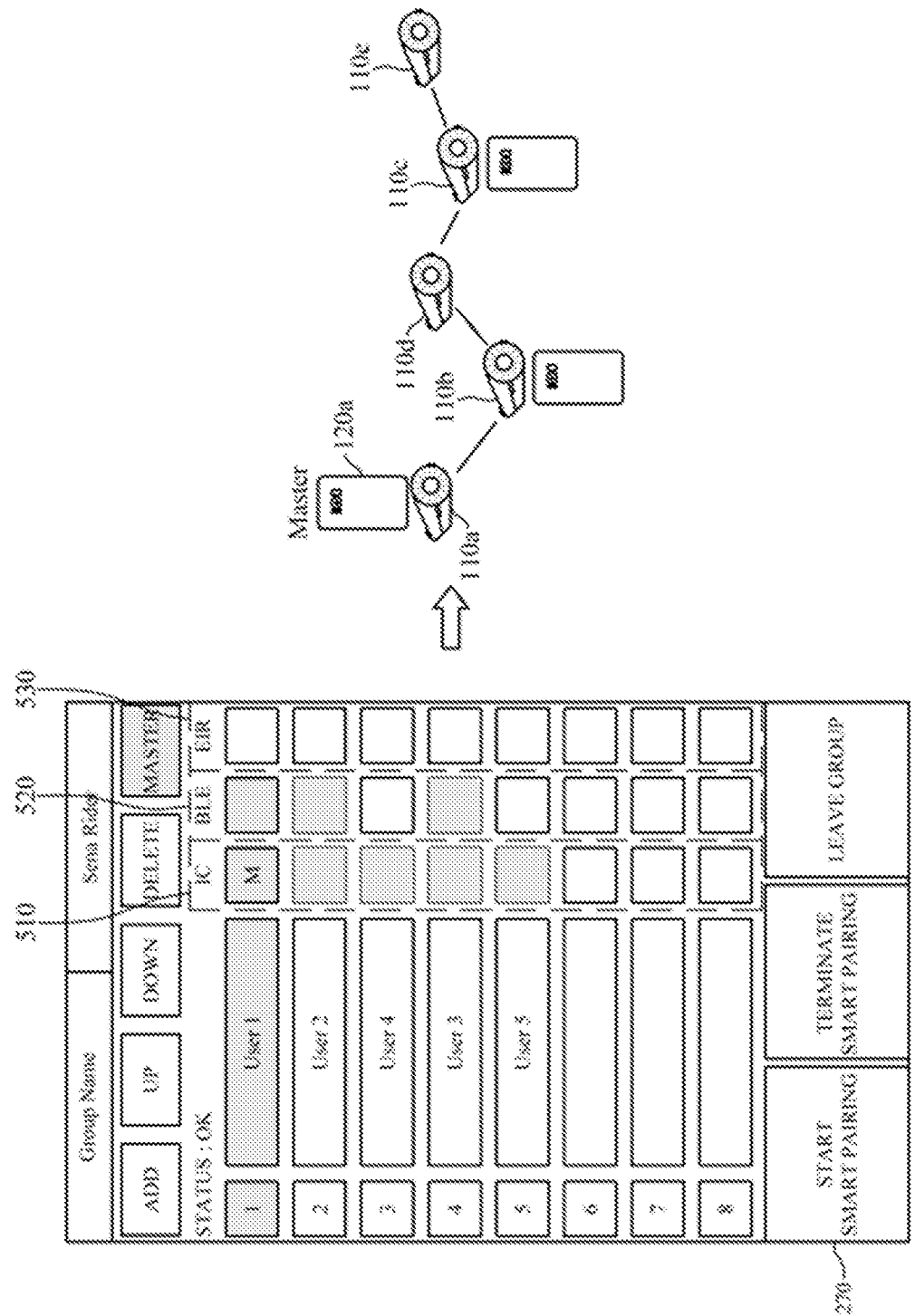

As shown in FIG. 5, when the addition or deletion of the intercom group member, and/or adjustment and setting of the connection order are completed, and the user of the first wireless intercom device 110a selects an object 270, the first wireless intercom device 110a may generate a group pairing command and transmit it to the second to fifth wireless intercom devices 110b to 110e, then the second to fifth wireless intercom devices 110b to 110e that have received the group pairing command may be wirelessly chain-connected to the first wireless intercom device 110a according to the set connection order. When the second to fifth wireless intercom devices 110b to 110e are wirelessly chain-connected to the first wireless intercom device 110a such that the group pairing is completed, the first mobile device 120a may display an intercom connection status 510 of each of the wireless intercom devices 110a to 110e, a connection status 520 of the mobile devices of each of the wireless intercom devices 110a to 110e, and an inquiry response search status 530 of each of the wireless intercom devices 110a to 110e.

Figure 6:
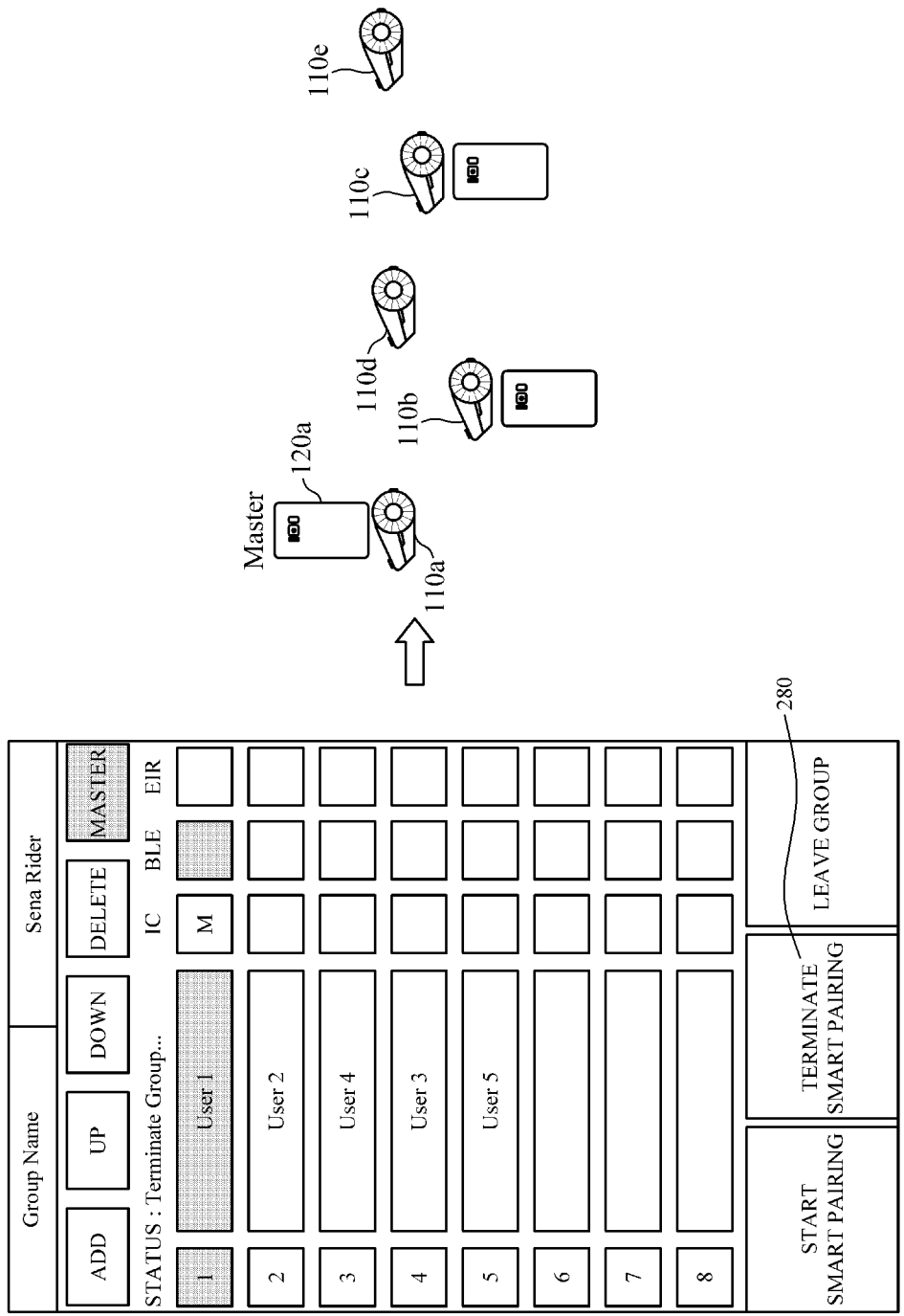
FIG. 6 is a view for describing a process of terminating group pairing.

FIG. 6 is a view for describing a process of terminating the group pairing.

Referring to FIG. 6, when the user of the first wireless intercom device 110a selects an object 280 on the interface screen displayed on the first mobile device 120a during the group intercom, the first wireless intercom device 110a may generate a group pairing terminating command and transmit it to the second to fifth wireless intercom devices 110b to 110e, then the first wireless intercom device 110a and the second to fifth wireless intercom devices 110b to 110e that have received the group pairing terminating command may disconnect the wireless connection with the wireless intercom devices connected to themselves. Through this, the group pairing may be terminated.

Figure 7:
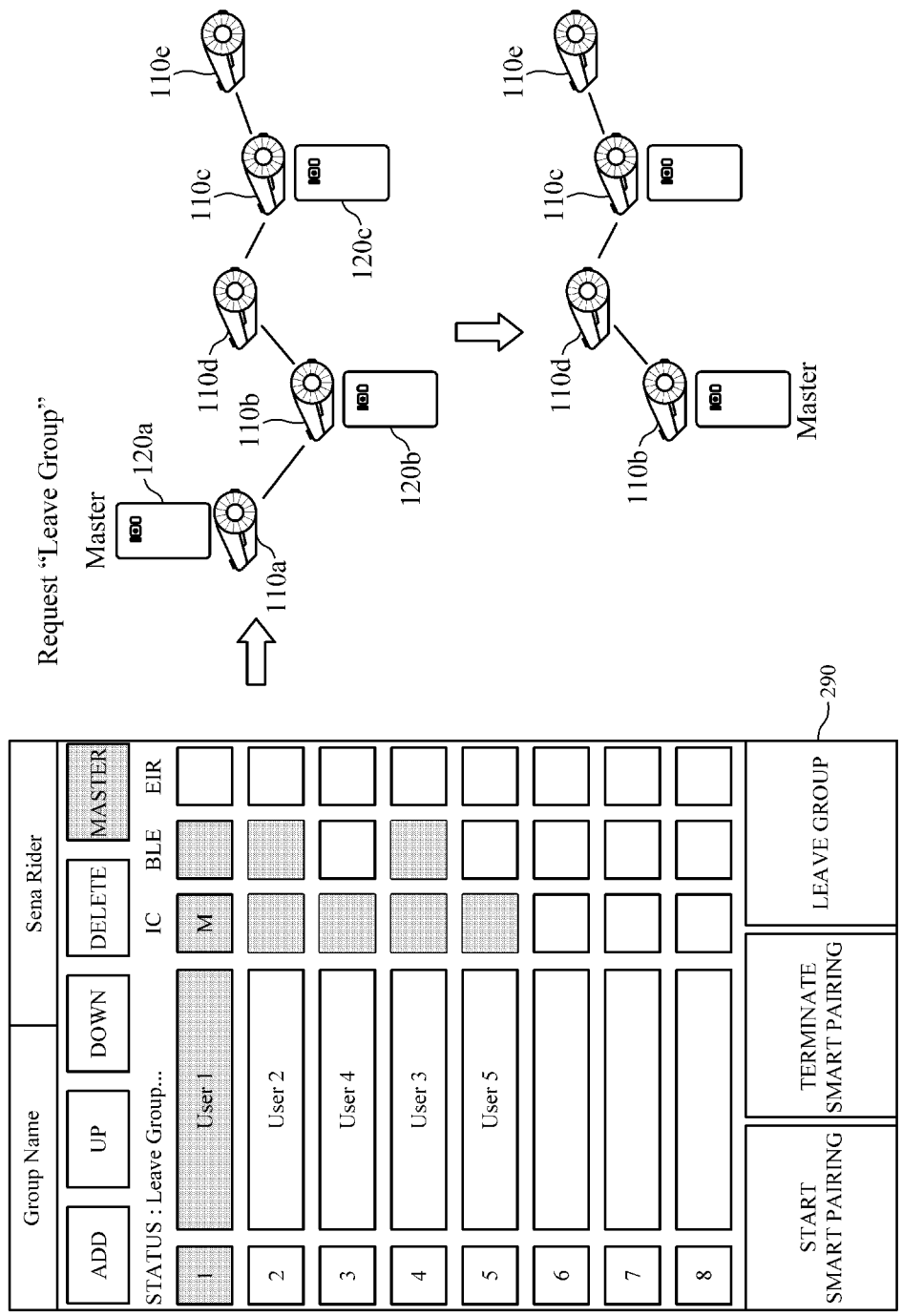
FIG. 7 is a view for describing a process in which a master wireless intercom device leaves an intercom group.

FIG. 7 is a view for describing a process in which a master wireless intercom device leaves the intercom group.

Referring to FIG. 7, when the user of the first wireless intercom device 110a who wants to leave the intercom group during the group intercom selects an object 290 on the interface screen displayed on the first mobile device 120a, the first wireless intercom device 110a may generate a group leave request message (Request "Leave Group") and transmit it to the second to fifth wireless intercom devices 110b to 110e. In addition, the first wireless intercom device 110a may select one of the wireless intercom devices 110b and 110c Bluetooth connected to the mobile devices 120b and 120c as the master wireless intercom device, then may leave the intercom group.

Figure 8:
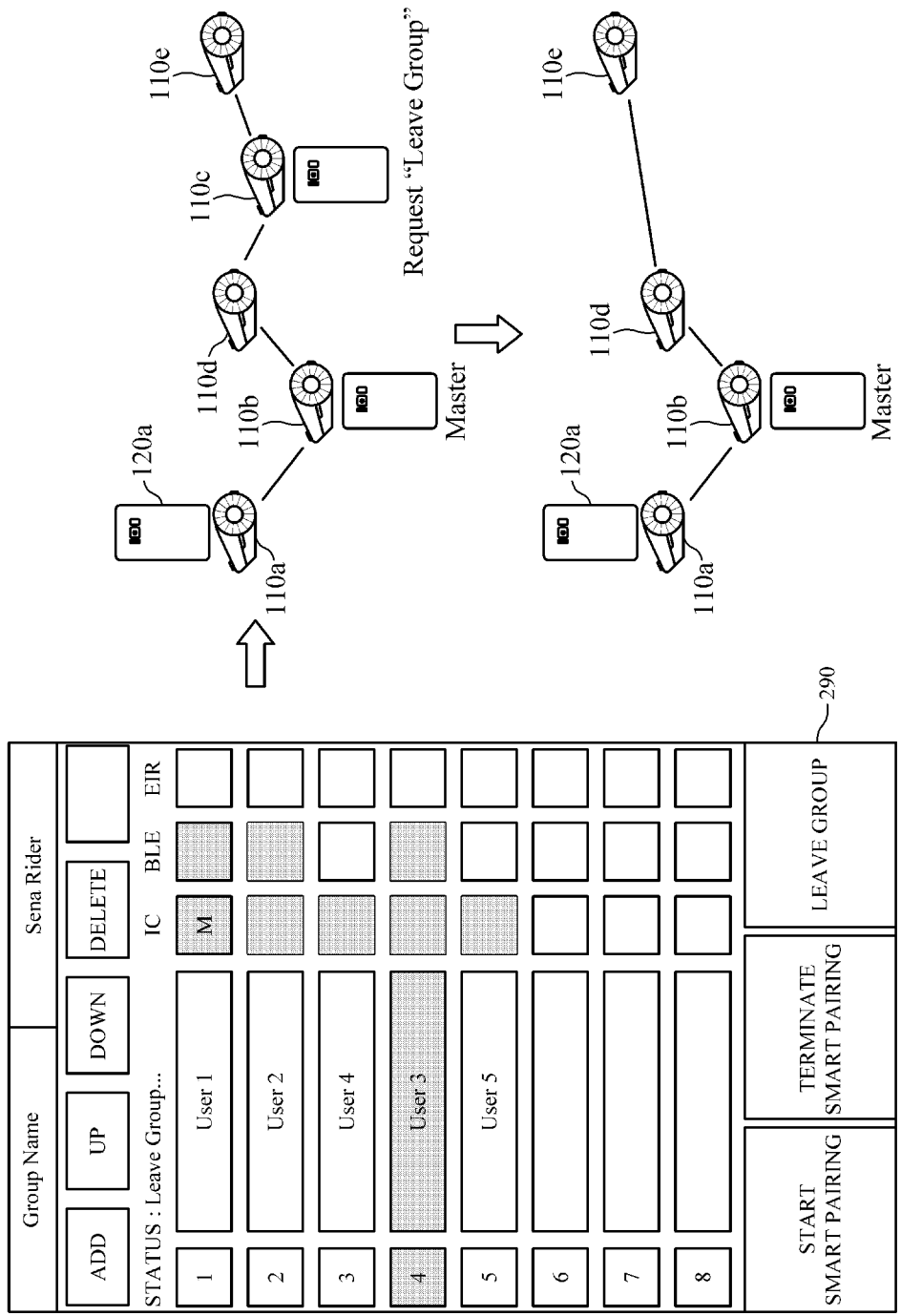
FIG. 8 is a view for describing a process in which a slave wireless intercom device leaves the intercom group.

FIG. 8 is a view for describing a process in which a slave wireless intercom device leaves the intercom group.

Referring to FIG. 8, when a user of the third wireless intercom device 110c who wants to leave the intercom group during the group intercom selects the object 290 on an interface screen displayed on the third mobile device 120c, the third wireless intercom device 110c may generate a group leave request message (Request "Leave Group") and transmit it to the first, second, fourth and fifth wireless intercom devices 110a, 110b, 110d and 110e, then may leave the intercom group.

When the third wireless intercom device 110c leaves the intercom group, the wireless connection between the fourth wireless intercom device 110d and the third wireless intercom device 110c and the wireless connection between the third wireless intercom device 110c and the fifth wireless intercom device 110e are disconnected, and the fourth wireless intercom device 110d and the fifth wireless intercom device 110e may be wirelessly connected.

FIGS. 9 to 12 are views for describing a reconnection process when the chain-connection is disconnected.

Figure 9:
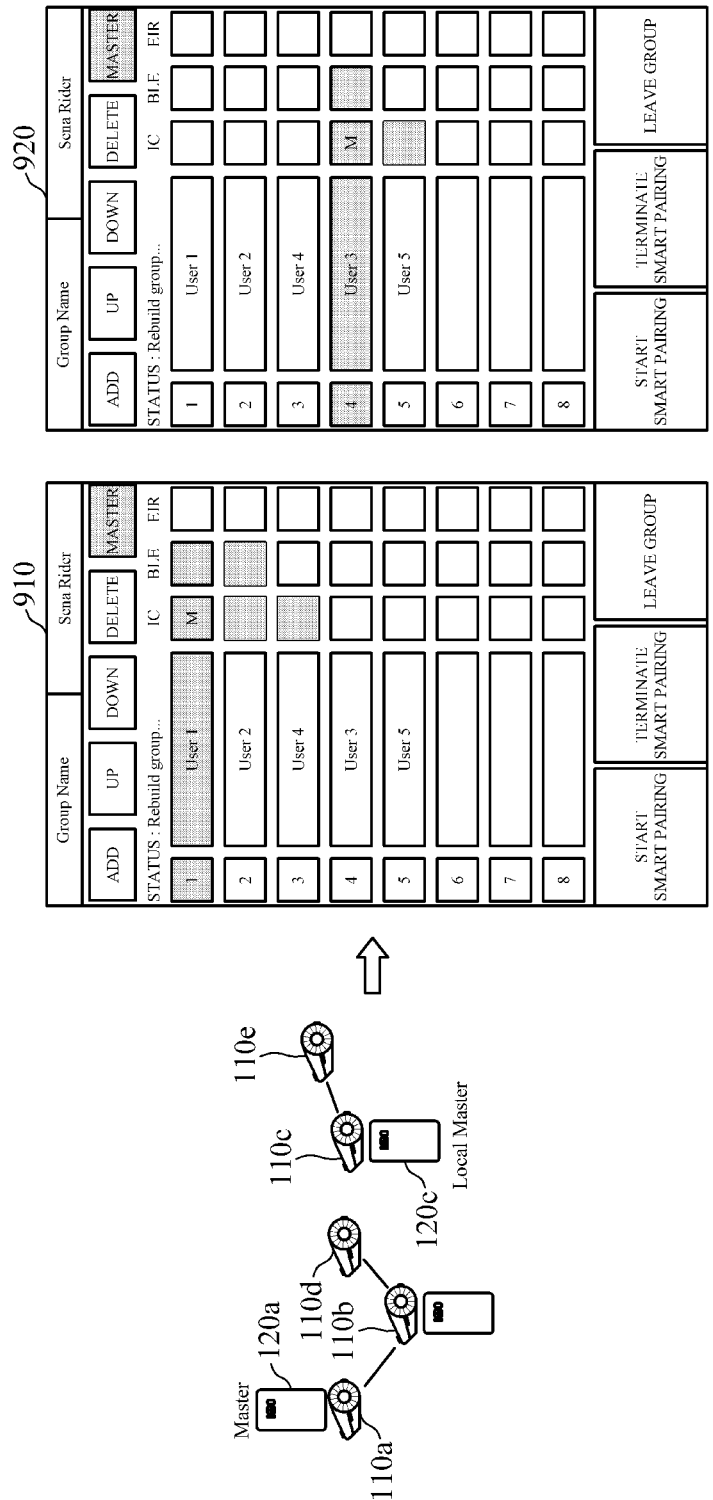
FIGS. 9 to 12 are views for describing a reconnection process when a chain-connection is disconnected.
Figure 10:
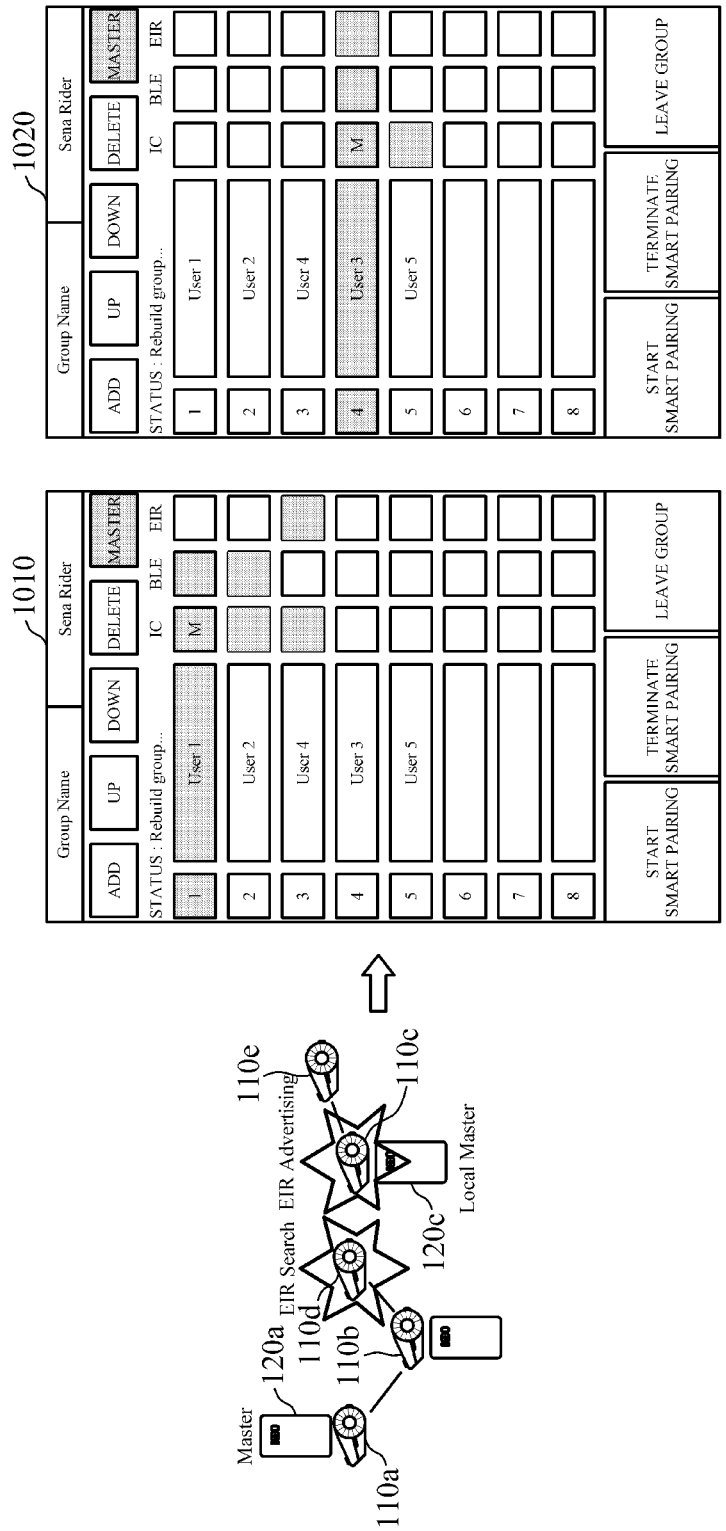

Referring to FIGS. 9 and 10, when the wireless connection between the fourth wireless intercom device 110d and the third wireless intercom device 110c is disconnected in a group intercom state, and the devices are divided into a first group including the first, second and fourth wireless intercom devices 110a, 110b and 110d, and a second group including the third and fifth wireless intercom devices 110c and 110e, a local master wireless intercom device may be set in the second group which does not include the first wireless intercom device 110a which is the master wireless intercom device. For example, among the third and fifth wireless intercom devices 110c and 110e of the second group, the third wireless intercom device 110c connected to the mobile device 120c may be set as the local master wireless intercom device.

Meanwhile, the first mobile device 120a may display an interface screen 910 in which the intercom connection status of the first, second and fourth wireless intercom devices 110a, 110b and 110d, and the connection status of the mobile devices are updated. In addition, as the local master wireless intercom device, the third mobile device 120c may display an interface screen 920 in which the intercom connection status of the third and fifth wireless intercom devices 110c and 110e, and the connection status of the mobile devices are updated.

The fourth wireless intercom device 110d of the first group including the first wireless intercom device 110a which is the master wireless intercom device may search for the third wireless intercom device 110c disconnected from itself using an inquiry response method, the first mobile device 120a may display an interface screen 1010 in which the inquiry response search status of the fourth wireless intercom device 110d is updated, and the third mobile device 120c may display an interface screen 1020 in which the inquiry response search status of the third wireless intercom device 110c is updated.

When the third wireless intercom device 110c is searched, the fourth wireless intercom device 110d and the third wireless intercom device 110c are automatically wirelessly connected, and the third wireless intercom device 110c that has been set as the local master wireless intercom device may be reset to the slave wireless intercom device again.

Figure 11:
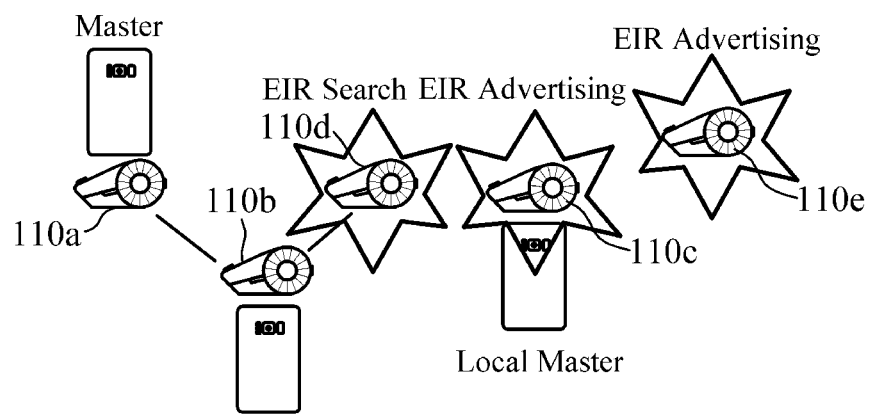
Figure 12:
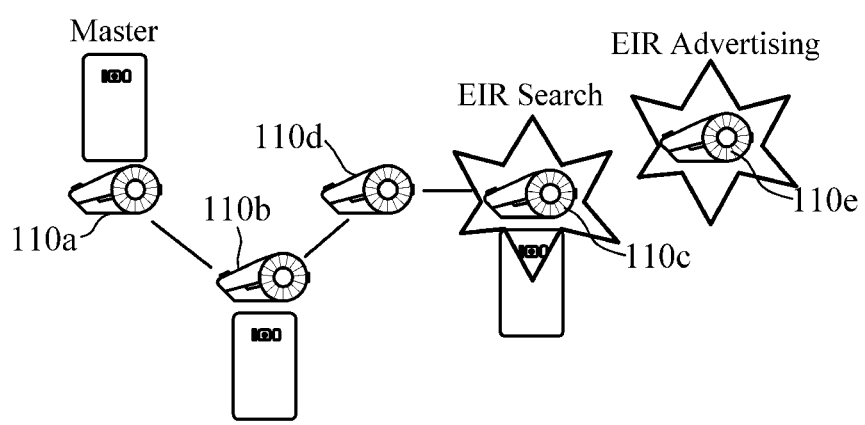

Referring to FIGS. 11 and 12, in the group intercom state, when the wireless connection between the fourth wireless intercom device 110d and the third wireless intercom device 110c is disconnected and the wireless connection between the third wireless intercom device 110c and the fifth wireless intercom device 110e is disconnected, and the devices are divided into a first group including the first, second and fourth wireless intercom devices 110a, 110b and 110d, and a second group including the third wireless intercom device 110c, and a third group including the fifth wireless intercom device 110e, in the second group, the third wireless intercom device 110*c* connected to the mobile device 120*c* may be set as the local master wireless intercom device. In this case, since there is no wireless intercom device connected to the mobile device in the third group, the process of setting the local master wireless intercom device may be omitted.

The fourth wireless intercom device 110*d* of the first group including the first wireless intercom device 110*a* which is the master wireless intercom device may search for the third wireless intercom device 110*c* disconnected from itself using the inquiry response method, and when the third wireless intercom device 110*c* is searched, the fourth wireless intercom device 110*d* and the third wireless intercom device 110*c* may be automatically wirelessly connected. Further, the third wireless intercom device 110*c* that has been set as the local master wireless intercom device may be reset to the slave wireless intercom device again.

When the fourth wireless intercom device 110*d* and the third wireless intercom device 110*c* are automatically wirelessly connected, the third wireless intercom device 110*c* may search for the fifth wireless intercom device 110*e* disconnected from itself using the inquiry response method. When the fifth wireless intercom device 110*e* is searched, third wireless intercom device 110*c* and the fifth wireless intercom device 110*e* may be automatically wirelessly connected.

Figure 13:
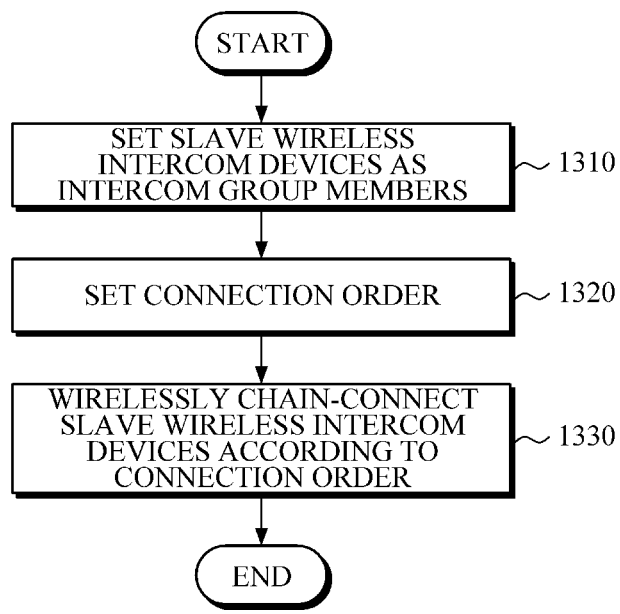
FIG. 13 is a flowchart illustrating an embodiment of a group pairing method of a wireless intercom system.

FIG. 13 is a flowchart illustrating an embodiment of a group pairing method of a wireless intercom system.

Referring to FIG. 13, the wireless intercom system may set intercom group members through a QR code scanning method or inquiry scanning method by using a mobile device wirelessly connected to the master wireless intercom device (1310).

For example, the wireless intercom system may scan a QR code displayed on a mobile device wirelessly connected to a slave wireless intercom device by the mobile device wirelessly connected to the master wireless intercom device to obtain information on the slave wireless intercom device (e.g., name, BDADDR etc.), and add the slave wireless intercom device to the intercom group.

For another example, the wireless intercom system may search for a slave wireless intercom device in an inquiry scanning state by the master wireless intercom device according to a command from the mobile device wirelessly connected to the master wireless intercom device to obtain information on the searched slave wireless intercom device (e.g., name, BDADDR, etc.), and add the searched slave wireless intercom device to the intercom group.

The wireless intercom system may set a connection order of intercom group members (1320).

The wireless intercom system may wirelessly chain-connect the intercom group members (the master wireless intercom device and the slave wireless intercom devices) according to the set connection order (1330). For example, the wireless intercom system may generate a group pairing command through the master wireless intercom device and transmit it to the slave wireless intercom devices which are the intercom group members, and wirelessly chain-connect the slave wireless intercom devices that have received the group pairing command to the master wireless intercom device according to the set connection order.

Figure 14:
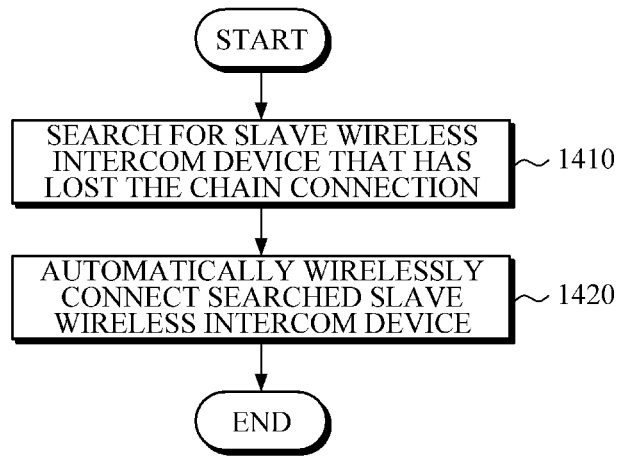
FIG. 14 is a flowchart illustrating an embodiment of the method of operating a wireless intercom system when a chain-connection is disconnected during the group intercom.

FIG. 14 is a flowchart illustrating an embodiment of the method of operating a wireless intercom system when the chain-connection is disconnected during the group intercom.

Referring to FIG. 14, if the chain-connection of the slave wireless intercom is disconnected during the group intercom, the wireless intercom system may search for the slave wireless intercom device that has lost the chain-disconnection, by using the wireless intercom device (the master wireless intercom device or the slave wireless intercom device) that has been connected to the slave wireless intercom device that has lost the chain-disconnection (1410). For example, assuming that, in a state in which the master wireless intercom device, a first slave wireless intercom device, a second slave wireless intercom device, a third slave wireless intercom device, and a fourth slave wireless intercom device are chain-connected in this order, the wireless connection between the second slave wireless intercom device and the third slave wireless intercom device is disconnected, and the devices are divided into a first group including the master wireless intercom device, the first slave wireless intercom device and the second slave wireless intercom device, and a second group including the third slave wireless intercom device and the fourth slave wireless intercom device, the wireless intercom system may search for the third slave wireless intercom device by using the second slave wireless intercom device belonging to the first group. In this case, the wireless intercom system may use an inquiry response search method.

When the slave wireless intercom device that has lost the chain-connection is searched, the wireless intercom system may automatically wirelessly connect the wireless intercom device (the master wireless intercom device or slave wireless intercom device) that has been connected to the searched slave wireless intercom device with the searched slave wireless intercom device (1420).

Meanwhile, if the chain-connection of the slave wireless intercom is disconnected during the group intercom, the wireless intercom system may set the slave wireless intercom device that has lost the chain-connection as the local master wireless intercom device. For example, in the above-described example, the third slave wireless intercom device may be set as the local master wireless intercom device of the second group.

Figure 15:
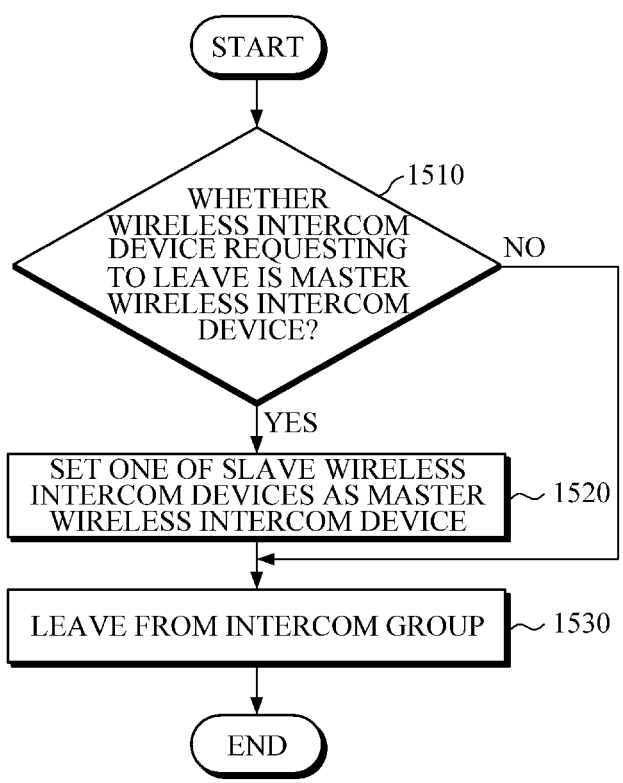
FIG. 15 is a flowchart illustrating an embodiment of the method of operating a wireless intercom system when there is a request to leave from a wireless intercom device during the group intercom.

FIG. 15 is a flowchart illustrating an embodiment of the method of operating a wireless intercom system when there is a request to leave from a wireless intercom device during the group intercom.

Referring to FIG. 15, when there is a request to leave from the wireless intercom device during the group intercom, the wireless intercom system may determine whether the wireless intercom device requesting to leave is the master wireless intercom device or the slave wireless intercom device (1510).

When the wireless intercom device requesting to leave is the master wireless intercom device, the wireless intercom system may select and set one of the slave wireless intercom devices as the master wireless intercom device (1520), and leave the wireless intercom device requesting to leave from the intercom group (1530).

On the other hand, when the wireless intercom device requesting to leave is the slave wireless intercom device, the wireless intercom system may leave the wireless intercom device requesting to leave from the intercom group.

Meanwhile, when the wireless intercom device leaves the intercom group, the wireless intercom system may wirelessly chain-connect the wireless intercom devices remaining in the intercom group.

An aspect of the present invention may be implemented as a computer-readable code in a computer-readable recording medium. The codes and code segments, which implement the above program, may be easily deduced by a computer programmer in the art. The computer-readable recording medium may include all types of recording devices for storing data that can be read by a computer system.

Examples of computer-readable recording medium may include ROM, RAM, CD-ROM, magnetic tape, floppy disk, optical disk and the like. Further, the computer-readable recording medium may be distributed over a computer system connected by a network, and written and implemented in computer-readable code that can be read by the computer in a distributed manner.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

The invention claimed is:

1. A group pairing method of a wireless intercom system comprising:
   scanning, by a master mobile device wirelessly connected to a master wireless intercom device, QR codes, which are displayed on slave mobile devices, to add a plurality of slave wireless intercom devices to an intercom group as intercom group members, wherein each slave mobile device is wirelessly connected to one of the plurality of slave wireless intercom devices;
   setting a connection order of the intercom group members by using the master mobile device wirelessly connected to the master wireless intercom device; and
   wirelessly chain-connecting the plurality of slave wireless intercom devices to the master wireless intercom device according to the set connection order.

2. The group pairing method of the wireless intercom system according to claim 1, further comprising:
   if the chain-connection of at least one slave wireless intercom device among the plurality of slave wireless intercom devices is disconnected, searching for at least one slave wireless intercom device that has lost the chain-connection, by using a wireless intercom device that has been connected to the at least one slave wireless intercom device that has lost the chain-connection; and
   automatically wirelessly connecting the wireless intercom device that has been connected to the at least one slave wireless intercom device that has lost the chain-connection with the searched at least one slave wireless intercom device.

3. The group pairing method of the wireless intercom system according to claim 2, wherein the step of searching for the at least one slave wireless intercom device that has lost the chain-connection comprises: searching for the at least one slave wireless intercom device that has lost the chain-connection using an inquiry response search method.

4. The group pairing method of the wireless intercom system according to claim 1, further comprising: searching for at least one slave wireless intercom device through an inquiry scanning method by the master wireless intercom device, and setting the searched at least one slave wireless intercom device as an intercom group member.

5. The group pairing method of the wireless intercom system according to claim 1, further comprising setting one of the plurality of slave wireless intercom devices as a master wireless intercom device, when the master wireless intercom device requests to leave from the intercom group during group intercom.

* * * * *